Jan. 13, 1931.  W. F. HALL  1,788,715
CLASSROOM CHART
Filed March 5, 1928   2 Sheets-Sheet 1
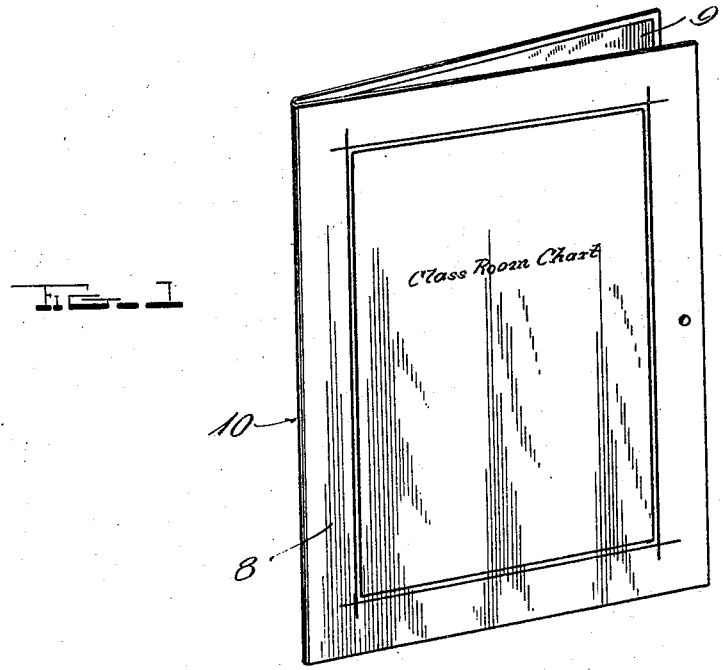
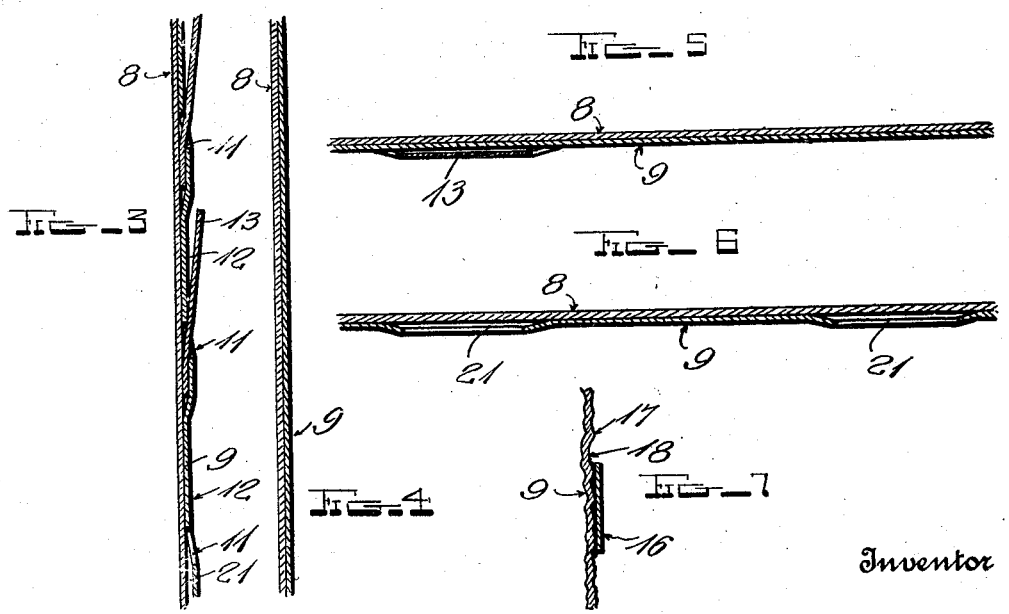
Willis Foster Hall, Jan. 13, 1931.  W. F. HALL  1,788,715
CLASSROOM CHART
Filed March 5, 1928   2 Sheets-Sheet 2
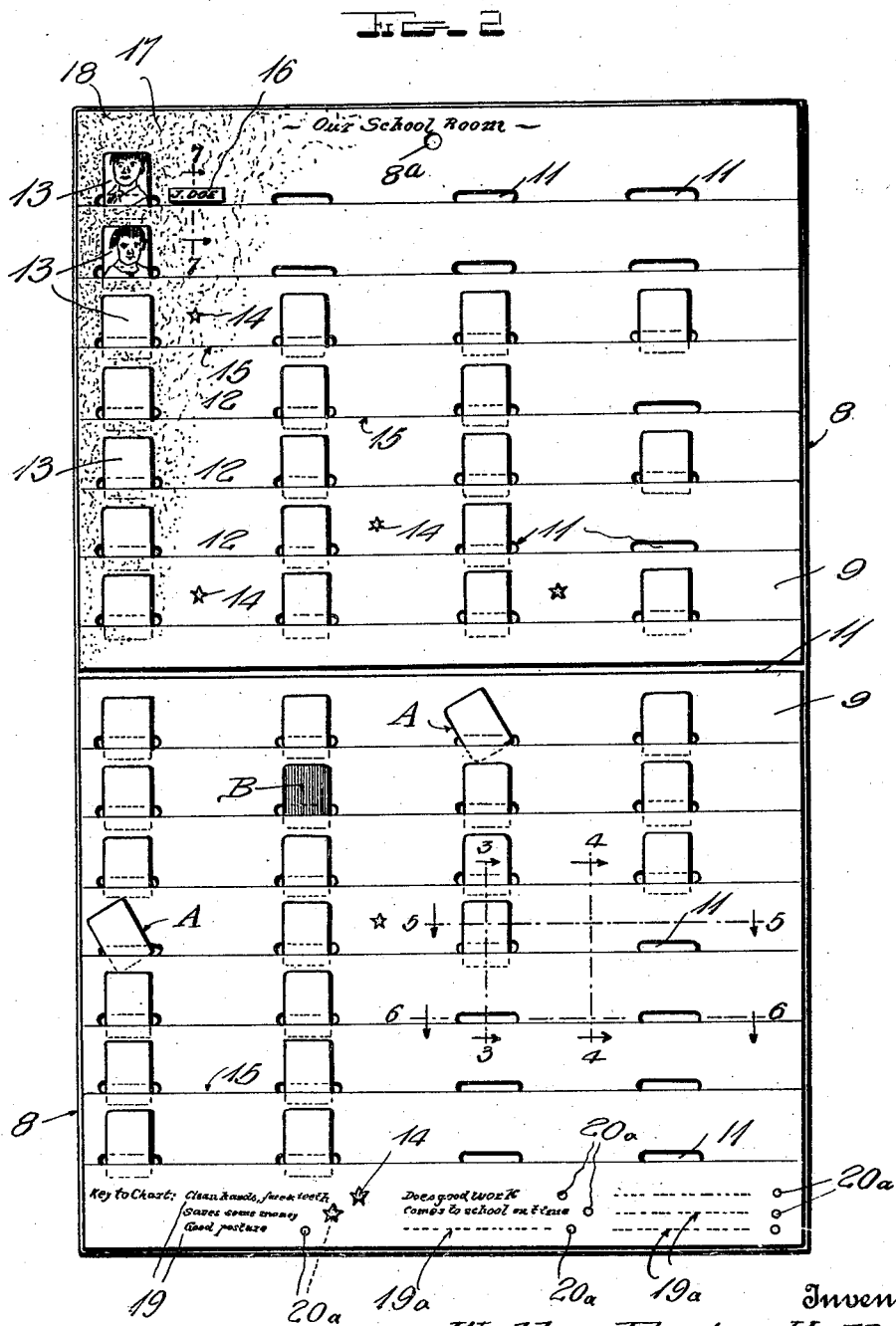
Inventor
Willis Foster Hall, Patented Jan. 13, 1931

1,788,715

UNITED STATES PATENT OFFICE

WILLIS FOSTER HALL, OF CAMBRIDGE, MASSACHUSETTS

CLASSROOM CHART

Application filed March 5, 1928. Serial No. 259,214.

The invention relates to a new and improved chart for use in schoolrooms of the lower grades to display photographs and the names of the pupils; to display emblems of merit opposite the photographs when the pupils depicted thereby deserve such emblems; to show on any day the pupils absent; and to disclose the identity of any pupils who may be guilty of misconduct. The chart is placed in full view of the class, the teacher and any visitors who may enter the classroom, and by thus having their characteristics determinable at a glance, there is a great incentive to the pupils to increase characteristics of merit and decrease those less meritorious, or objectionable.

One aim of the invention is to provide a chart which embodies holders for holding photographs of the pupils in the order in which they are seated, spaces by said holders to display the pupils' names and to contain emblems of merit when deserved, and a key to explain the meanings of the emblems, said key preferably having a number of printed explanatory statements and markers by the printing at which to secure emblems explained thereby.

The pupils' names are preferably written on strips of paper or the like and pasted in the above-named spaces, and as it is often necessary to move a child's seat and to consequently move his photograph and name on the chart, further objects are to make novel provision whereby the photograph and the name may be readily moved.

With the foregoing in view, the invention resides in the novel subject matter hereinafter described and claimed, description being accomplished by reference to the accompanying drawings.

Fig. 1 is a perspective view of one of the charts in folded position.

Fig. 2 is a front elevation of the chart showing the manner of using the same.

Figs. 3 and 4 are detailed vertical sectional views on lines 3—3 and 4—4 of Fig. 2.

Figs. 5 and 6 are horizontal section views on the correspondingly numbered lines of Fig. 2.

Fig. 7 is an enlarged detail section on line 7—7 of Fig. 2.

The preferred form of construction has been illustrated and such construction will be herein specifically described, with the understanding that within the scope of the invention as claimed, variations may be made.

The numeral 8 denotes a backing sheet of heavy paper or light cardboard, and the numerals 9 denote front sheets of cardboard which are glued to the backing sheet 8 in a manner hereinafter described, the two sheets 9 being spaced apart at their inner edges to provide a folding line 10 along which the chart may be folded, as seen in Fig. 1.

The sheets 9 are provided with rows of slots 11 corresponding to desks of a classroom, said rows being rather widely spaced, leaving a vacant space 12 oposite each slot 11. Photographs 13 of the pupils are placed in the slots 11 in the same order as that in which the children are seated in the classroom, and the spaces 12 by these photographs will display the names of the scholars and stickers or other emblems of merit 14, when such emblems are deserved. Preferably, the spaces 12 are separated from each other by distinct horizontal lines 15 so that there will be no doubt as to exactly what space is assigned to any particular photograph. The pupil's names may be written directly upon the spaces 12 if desired. However, as it is often necessary to move a child from one deck to another, his photograph and name should be correspondingly moved on the chart. Hence, it is preferable to write the names upon strips 16 of paper or the like, and to secure these strips upon the spaces 12 in such manner that they may be readily detached for movement with the photographs when necessary. In order that this may be accomplished, the cardboard sheets 9 have a front surface formed with a myriad of raised and depressed portions 17—18, and this surface is of a rather hard and glossy nature. Thus, the paste used in securing the name strips 16 will adhere only to the raised portions 17 and will not as tenaciously adhere to said raised portions as it would if cardboard of some other kind were used. Hence, when a photograph is to be moved from one slot to another, it is an easy matter to remove the corresponding name strip by inserting a pen-knife or the like under it, so that this strip also may be moved.

One of the sheets 9 in the present disclosure, is provided with a "key to chart." This key embodies a number of printed statements 19 regarding the individual symbols or emblems 14, and markers 20 printed on the sheet by the statements, showing proper points at which to secure emblems explained by said statements. Then too, the key preferably embodies blank lines 19a having markers 20a so that additional emblems may be placed upon these markers if desired and explained upon the lines 19a.

Assuming that a red emblem denotes "Clean face, hands and teeth"; a blue symbol represents "Saves money"; a green symbol is used for "Good posture," and a golden symbol is employed to denote "Does good work"; symbols of these descriptions will be placed on the key opposite the above quoted statements, and whenever a child is deserving of any of the symbols, one is placed opposite his or her photograph. The chart is preferably kept in full view of the class, the teacher and any visitors entering the room, and anyone unfamiliar with the meanings of the emblems, may determine such meanings by referring to the key. Hence, it is an easy matter for anyone to consult the chart and become acquainted with the characteristics of any pupil or pupils in which interested. There is thus a great incentive created, for the pupils to strive for good grades, for good posture, for cleanliness, etc. Moreover, when any child is absent, his picture is placed in an inclined position in its slot 11, as shown at A in Fig. 2, and whenever a pupil is guilty of such misconduct as to deserve such "humiliation," his photograph is turned with its face to the chart, as indicated at B in Fig. 2, and the photo remains in this position until the pupil is again restored to good graces. Thus, there is further incentive created toward regular attendance and exemplary conduct.

The construction of the chart is such that the various photographs 13 are tenaciously held in place, yet may be readily removed or angled when desired. The lower ends of these photographs are frictionally held behind the portions of the sheets 9 directly under the lower edges of the slots 11, which portions are left free of attachment with the backing sheet 8, to provide pockets for the reception of the lower end portions of the photographs. All other portions of the sheets 9 may be glued to the backing sheet 8 if desired, but to overcome any possibility of any of the glue running out into the slots 11 when the sheets are pressed together, the glue preferably terminates quite a distance from all edges of the slots. For purposes of illustration, the photo-receiving pockets, denoted at 21, are shown open in Figs. 3 and 6. In reality, however, these pockets are flatly closed when no photographs are held thereby.

Attention is invited to the fact that when the two halves of the folder are swung into a common plane as seen in Fig. 2, the slots of the upper card 9 are vertically alined with those of the lower card 9, so that these rows of slots correspond to the rows of desks of the classroom. The upper half of the folder is formed with an opening 8a or other provision is made permitting hanging of said folder in open position, with the lower half pendent from the upper half, and even though the sheets 8—9 need not in themselves be of very stiff material, as they are glued together, they form a sufficiently stiff structure to prevent warping or curling so that the entire device will hang readily in a vertical plane with all of the pictures and names clearly visible.

It will be seen from the above that novel, advantageous and inexpensive provision has been made for carrying out the objects of the invention. The exact details disclosed have proven desirable from all angles in the manufacture and use of the device, and are therefore preferably followed. However, attention is again invited to the fact that minor variations may be made.

I claim:—

1. A classroom chart in the form of a folder comprising a backing sheet having a fold line dividing it into upper and lower halves, the upper edge of the upper half having means whereby the sheet may be suspended with the lower half pendent from said upper half, and two separate front sheets covering said halves of the backing sheet respectively and having straight horizontal slots corresponding to desks of a classroom, the slots of one of said front sheets being alined with those of the other when the folder is opened and suspended, whereby the rows of slots correspond to the rows of desks in the classroom, said backing and front sheets being glued together between the slots with the glue terminating in downwardly spaced relation with the lower edges of the slots, permitting limited insertion of the lower ends of photographs of the pupils behind said lower slot edges to be frictionally held between the backing and front sheets, the portions of said front sheets at the upper edges of the slots lying in flat position against the backing sheet to allow the photographs to lie substantially flat against the front sheets, said front sheets having horizontal lines defining blank areas adjacent said slots in which to display the pupils' names.

2. A classroom chart comprising a backing sheet, and a front sheet having straight horizontal photograph-receiving slots, the two sheets being glued together between the slots with the glue terminating in downwardly spaced relation with respect to the lower edges of said slots, permitting limited insertion of the lower end portions of photographs behind said edges to be frictionally held between the two sheets, the portions of the front sheet at the upper edges of the slots lying in flat position against the backing sheet to allow the photographs to lie substantially in a plane parallel with the front face of the chart.

3. A classroom chart comprising a board having rows of picture holders corresponding to rows of desks of a classroom for detachably holding photographs of the pupils, portions of said board adjacent said holders having a multiplicity of raised and depressed portions; whereby upon pasting of name strips upon the board adjacent the holders, said strips will adhere only to said raised portions and may therefore be easily removed if any photograph and its name strip are to be moved to another portion of the chart.

In testimony whereof I have hereunto affixed my signature.

WILLIS FOSTER HALL.